(12) United States Patent
Convery

(10) Patent No.: US 8,344,305 B2
(45) Date of Patent: Jan. 1, 2013

(54) SYSTEM AND METHOD FOR ALIGNING HELIOSTATS OF A SOLAR POWER TOWER

(76) Inventor: Mark R. Convery, San Mateo, CA (US)

( * ) Notice: Subject to any disclaimer, the term of this patent is extended or adjusted under 35 U.S.C. 154(b) by 443 days.

(21) Appl. No.: 12/727,124

(22) Filed: Mar. 18, 2010

(65) Prior Publication Data
US 2010/0252024 A1    Oct. 7, 2010

Related U.S. Application Data

(60) Provisional application No. 61/161,316, filed on Mar. 18, 2009.

(51) Int. Cl.
*G01C 21/02* (2006.01)
*F24J 2/38* (2006.01)

(52) U.S. Cl. ............... 250/203.4; 126/578; 126/601

(58) Field of Classification Search ........... 250/203.4; 353/3; 126/573, 578, 600, 601; 136/246, 136/248
See application file for complete search history.

(56) References Cited

U.S. PATENT DOCUMENTS

| | | | |
|---|---|---|---|
| 4,154,219 A | 5/1979 | Gupta et al. | |
| 4,172,443 A | 10/1979 | Sommer | |
| 4,192,583 A | 3/1980 | Horton | |
| 4,211,922 A | 7/1980 | Vaerewyck et al. | |
| 4,219,729 A | 8/1980 | Smith | |
| 4,276,872 A | 7/1981 | Blake et al. | |
| 4,440,150 A | 4/1984 | Kaehler | |
| 4,519,382 A | 5/1985 | Gerwin | |
| 4,536,847 A | 8/1985 | Erickson et al. | |
| 4,564,275 A | 1/1986 | Stone | |
| 5,861,947 A | 1/1999 | Neumann | |
| 5,862,799 A | 1/1999 | Yogev et al. | |
| 7,207,327 B2 | 4/2007 | Litwin et al. | |
| 8,122,878 B1 * | 2/2012 | Gross et al. | 126/600 |
| 2004/0231660 A1 | 11/2004 | Nakamura | |
| 2006/0042624 A1 | 3/2006 | Zhang | |
| 2008/0128017 A1 | 6/2008 | Ford | |
| 2008/0236568 A1 | 10/2008 | Hickerson et al. | |
| 2009/0107485 A1 | 4/2009 | Reznik et al. | |
| 2009/0178668 A1 | 7/2009 | Boggavarapu | |
| 2009/0249787 A1 | 10/2009 | Pfahl et al. | |
| 2010/0006087 A1 | 1/2010 | Gilon et al. | |

FOREIGN PATENT DOCUMENTS

WO    WO 2009/152573    12/2009

OTHER PUBLICATIONS

Heliostat Cost Reduction Study Jun. 2007, Sandia National Laboratories Gregory J. Kolb, Scott A. Jones, Matthew W. Donnelly, David Gorman, Robert Thomas, Roger Davenport, Ron Lumia.

* cited by examiner

*Primary Examiner* — Thanh Luu
(74) *Attorney, Agent, or Firm* — Jeffrey Schox

(57) ABSTRACT

Disclosed is a solar power tower heliostat alignment system and method that includes a solar power tower with a focal area, a plurality of heliostats that each reflect sunlight towards the focal area of the solar power tower, an off-focal area location substantially close to the focal area of the solar power tower, a communication link between the off-focal area location and a misaligned heliostat, and a processor that interprets the communication between the off-focal area location and the misaligned heliostat to identify the misaligned heliostat from the plurality of heliostats and that determines a correction for the identified misaligned heliostat to realign the misaligned heliostat to reflect sunlight towards the focal area of the solar power tower.

35 Claims, 4 Drawing Sheets

SYSTEM AND METHOD FOR ALIGNING HELIOSTATS OF A SOLAR POWER TOWER

This application claims the benefit of U.S. Provisional Application No. 61/161,316, filed 18 Mar. 2009, which is incorporated in its entirety by this reference.

CROSS-REFERENCE TO RELATED APPLICATIONS

This invention was made with State of Calif. support under California Energy Commission Grant number 56084A/08-20. The Energy Commission has certain rights to this invention.

TECHNICAL FIELD

This invention relates generally to the solar power generation field, and more specifically to an improved system and method for aligning heliostats of a solar power tower.

BACKGROUND

Solar tower power generation plants rely on concentrated sunlight to generate power. The concentrated sunlight generally results from a field of heliostat mirrors that reflect sunlight at a focal area on the solar power tower, creating an area of concentrated solar energy, which may then be converted into electrical energy through a photovoltaic cell, by heating water to create steam that drives a turbine, and/or any other suitable method. The concentrated solar energy may also be stored in a thermal mass and converted at a later time. The field of heliostat mirrors often includes several hundred to over a thousand heliostat mirrors that track the sun and reflect sunlight towards the focal area of the solar power tower. Because the solar tower power generation plants rely so heavily on the concentration of solar energy, the efficiency of a solar tower power generation plant is heavily affected if the heliostats are inaccurate at tracking the sun and consequently are misaligned away from the focal area of the solar power tower. Heliostats typically track the sun in an open-loop manner, where the known positions of the sun are programmed into each heliostat and the mirror is moved according to the known positions. However, due to inaccuracies that may exist in the known positions of the sun and/or the movements of the heliostat mechanism, the actual orientation of the reflective mirror of the heliostat may not be at the desired location and the reflected sunlight may not be aligned correctly towards the focal area of the solar power tower, which decreases efficiency. According to a report published by Sandia National Laboratories, a reduction in sun tracking errors from just two to one milliradian may reduce the cost of a solar tower power generation plant as much as 5%.

Closed loop systems that track the actual reflection direction of the heliostat and then correct misalignment have been proposed, but are very costly to implement. Examples of such systems are disclosed in U.S. Pat. No. 7,207,327 and U.S. Patent Application Number 2009/0249787 that utilize image recognition techniques located at each heliostat. According to the report published by Sandia National Laboratories, the cost of heliostats constitute about 60% of a solar tower power generation plant. The cost of implementing a reflection direction detection system for each individual heliostat will increase the overall cost of the solar power generation plant at least proportionally to the number heliostats in the heliostat field, and with such high numbers of heliostats in each heliostat field, this may substantially increase the cost of the solar tower power generation plant. Cost of solar tower power generation plants is also a significant barrier to wider implementation of solar tower power generation plants.

Thus, there is a need in the solar power tower field to create an improved heliostat alignment system and method that is effective and cost efficient. This invention provides such an improved heliostat alignment system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
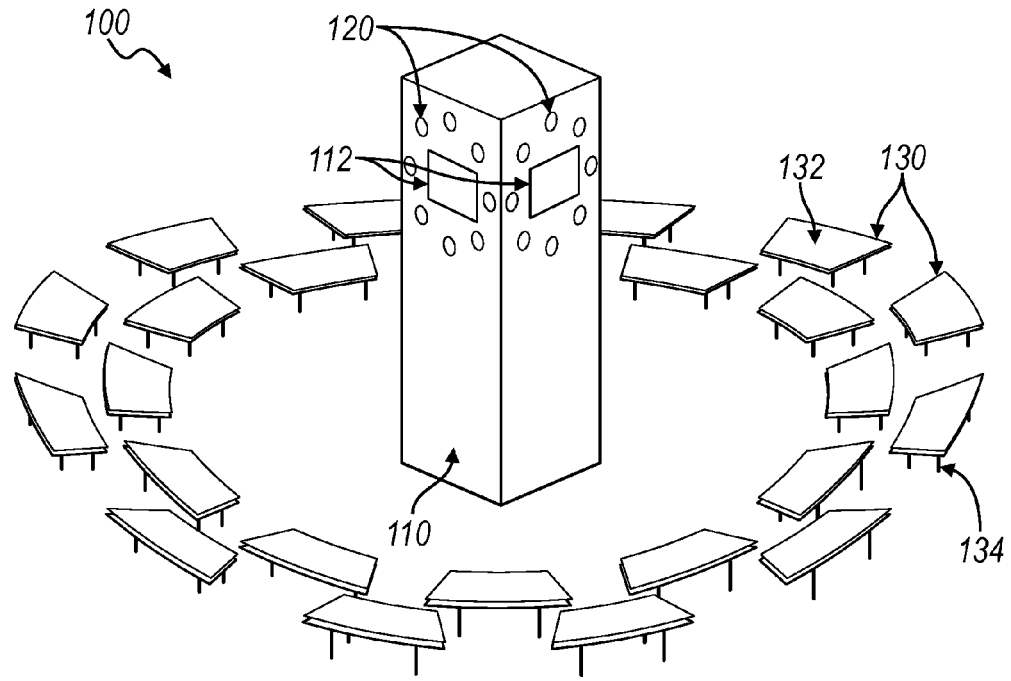
FIG. 1 is a schematic representation of the alignment system of the preferred embodiments.
Figure 2:
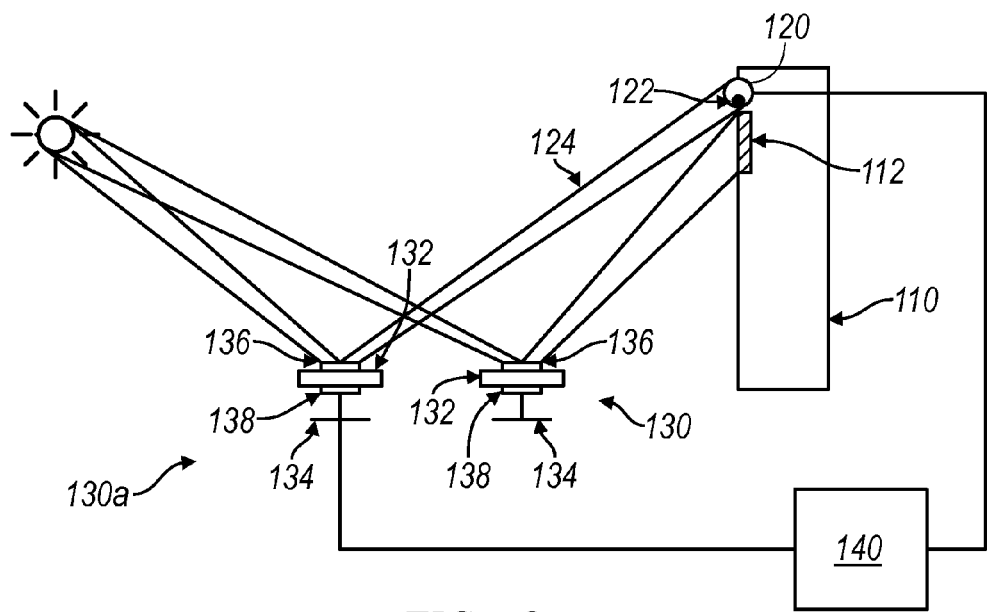
FIG. 2 is a schematic representation of the communication link between a misaligned heliostat and an off-focal area location of the first preferred embodiment.

As shown in FIGS. 1 and 2, the alignment system too includes a solar power tower 110 with a focal area 112 and an off-focal area location 120 that is substantially close to the focal area 112 of the solar power tower 110, a plurality of heliostats 130 with a reflective mirror 132 and a sun tracking mechanism 134 that moves and aligns the reflective mirror to reflect sunlight towards the focal area 112 of the solar power tower 110, a communication link 124 between the off-focal area location 120 and a misaligned heliostat 130a (shown in FIG. 2 as reflected sunlight), and a processor 140 that interprets the communication link between the off-focal area location and the misaligned heliostat 130a to identify the misaligned heliostat 130a. The processor 140 preferably also determines a correction for the identified misaligned heliostat 130a to realign the misaligned heliostat 130a to reflect sunlight towards the focal area 112 of the solar power tower 110.

Figure 3:
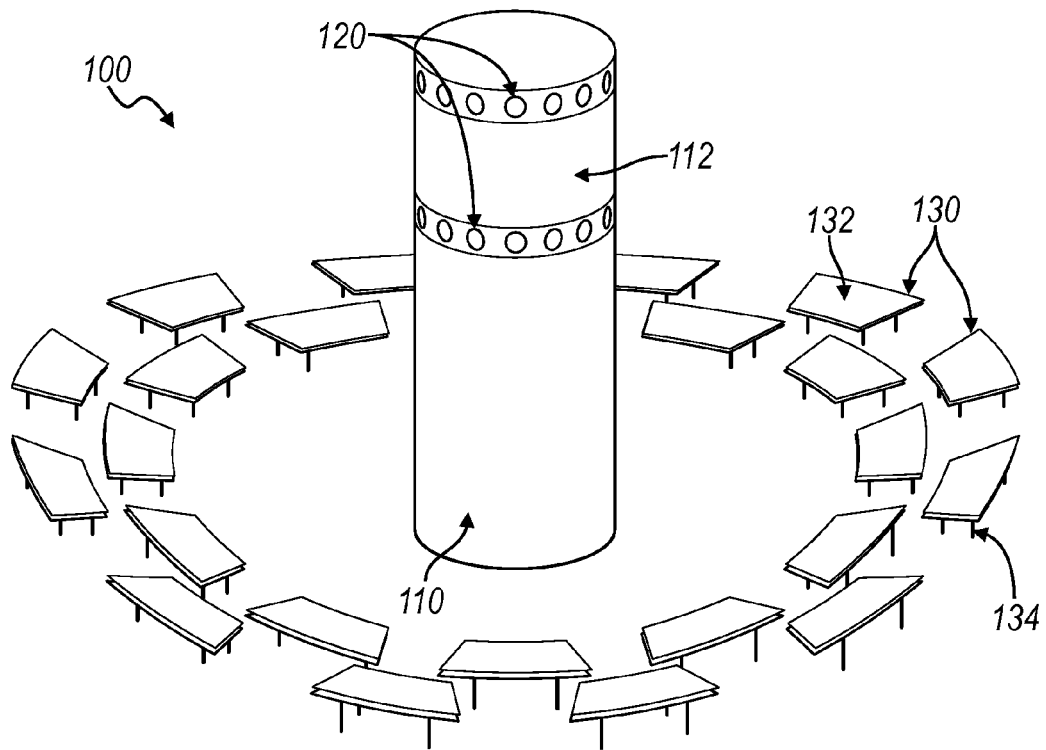
FIG. 3 is a schematic representation of the alignment system of the preferred embodiments with a second variation of the solar power tower.

As shown in FIG. 2, a misaligned heliostat 130a is a heliostat that is aligned not towards the focal area 112 of the solar power tower 110 as expected, but rather away from the focal area 112. This misalignment may be a result of an accumulation of small errors in the sun tracking mechanism 134 over time, strong winds that misalign the sun tracking mechanism 134 and cause the solar tracking mechanism 134 to be shifted, manufacturing errors in the heliostat, or any other suitable source of error. The communication link 124 is preferably a direction based communication link that is established when the reflective mirror 132 of a heliostat is reflecting sunlight towards the off-focal area location 120, indicating that the reflective mirror 132 is not reflecting sunlight towards the focal area 112 and alerting to the alignment system 100 that there is a misaligned heliostat 130a. As shown in FIG. 1, the off-focal area location 120 preferably surrounds the focal area 112 such that reflected sunlight from a misaligned heliostat 130a will be directed towards the off-focal area location 120. This variation arrangement of the off-focal area location 120 is particularly applicable to designs of solar power towers that include an aperture that functions as the focal area 110. In variations of solar power towers that include a focal area 112 that rings the tower, as shown in FIG. 3, the off-focal area location 120 may be located above and/or below the focal area 112. In variations of solar power towers that include a reflection assist element that functions to increase reflection of sunlight into the focal area 112, the off-focal area location 120 is preferably located outside of the reflection assist element. For example, the reflection assist element may be a reflective shield that surrounds the focal area 112 that functions to reflect additional sunlight into the focal area 112 and the off-focal area location 120 may surround the reflective shield. Alternatively, the off-focal area location 120 may be located in between the reflection assist element and the focal area 112 or within the reflection assist element. This may allow the alignment system 100 to detect sunlight that may be misdirected towards the reflection assist element instead of directed at the focal area 112. However, any other suitable arrangement of the off-focal area location 120 may be used. Because the sun tracking mechanism 134 of each heliostat is substantially accurate, the reflected sunlight from misaligned heliostats 130a is typically not far removed from the focal area 112. Thus, the off-focal area location 120 is preferably substantially close to the focal area 112. However, any other suitable arrangement of the off-focal area location 120 may be used. Additionally, the off-focal area location 120 is preferably not located to obstruct the reflected sunlight from an aligned heliostat from reaching the focal area 112. Preferably, when a heliostat 130 is aligned, no communication link is formed with the off-focal area location 120, allowing the processor to focus only on those heliostats 130 that are misaligned and in need of realignment. This allows the alignment system 100 of the preferred embodiments to appropriate resources efficiently and effectively, potentially decreasing complexity and cost of the alignment system 100. The alignment system 100 preferably also recognizes that a communication link 124 established between a heliostat 130 and the off-focal area location 120 does not always indicate misalignment. For example, at certain times of the day, in particular when the sun is low on the horizon, it may be extremely difficult for a heliostat 130 to reflect sunlight towards the focal area 112 without also reflecting sunlight towards the off-focal area location 120 (e.g., "spilling over" to the off-focal location).

Figure 4:
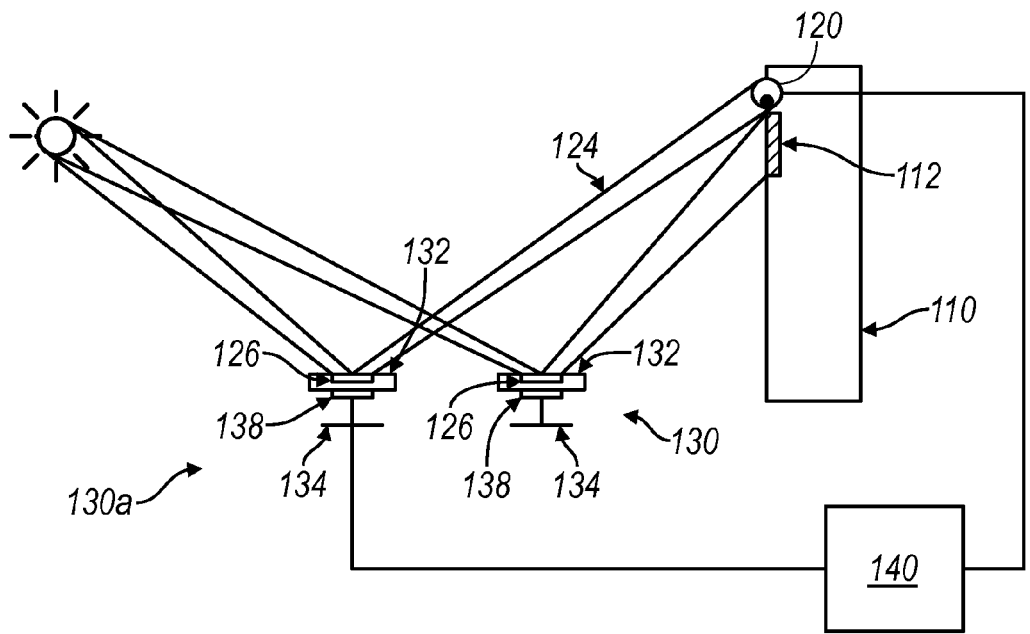
FIG. 4 is a schematic representation of the communication link between a misaligned heliostat and an off-focal area location of the second preferred embodiment.

The alignment system 100 is preferably one of two preferred embodiments: a first preferred embodiment where a sensor 122 is located at the off-focal area location 120 and each of the heliostats 130 include a transmitter 136 that transmits a signal and where the transmitter 136 of the misaligned heliostat 130a transmits a signal to the sensor 122 through the communication link 124 (shown in FIG. 2), and a second preferred embodiment where a sensor 126 is located at each of the heliostats and where the sensor 126 of the misaligned heliostat 130a receives a signal from the off-focal area location 120 through the communication link 124 (shown in FIG. 4).

1. System of the First Preferred Embodiment

In the first preferred embodiment, the misaligned heliostat 130a includes a transmitter 136 that preferably sends a signal to the sensor 122 at the off-focal area location 120 through the communication link 124. As mentioned above, the communication link 124 is preferably direction based, thus, a signal from a heliostat 130 that is received by the sensor 122 at the off-focal area location 120 will indicate misalignment of the heliostat 130. The sensor 122 located at the off-focal area location 120 may function to detect any misaligned heliostat 130a and a sensor for each heliostat 130 in the plurality of heliostats 130 is not necessary, potentially decreasing the cost and complexity of the alignment system 100. However, unlike the other preferred embodiment, because the sensor 122 is located at the off-focal area location 120 and not at each individual heliostat 130, receipt of a signal 122 does not indicate to the alignment system 100 which heliostat 130 is the misaligned heliostat 130a. The processor 140 may identify the misaligned heliostat 130a from the plurality of heliostats 130 in a variety of ways.

In each of these variations, the transmitter 136 is preferably the reflective mirror 132 of each of the plurality of heliostats 130 and the signal detected by the sensor 122 preferably includes reflected sunlight from the reflective mirror 132 of the misaligned heliostat 130a. Each heliostat 130 may include (or share) a reflection modification element 138 that modifies the reflection of sunlight in a way that is detectable by the sensor 122. In a first example, the reflection modification element 138 is a cover that blocks the reflection of the sunlight from the reflective mirror 132, thus pausing transmission of the signal. In a second example, the reflection modification element 138 is the sun tracking mechanism that moves the reflective mirror 132 substantially to direct reflected sunlight substantially away from the solar power tower 110. In a third example, the reflection modification element 138 is a light filter that modifies the sunlight reflected to the solar power tower from the heliostat 130. In a fourth example, the reflection modification element 138 is a vibration element that dithers the reflective mirror of the heliostat and modifies the light reflected towards the solar power tower from the heliostat 130. The reflection modification element 138 may alternatively be any other suitable reflection modifier.

The sensor 122 is preferably a photosensor such as a photodiode or a photoresistor that detects the reflected sunlight from the reflective mirror 132 of the misaligned heliostat 130a. The sensor 122 preferably also detects the amount of reflected light that is directed at the off-focal area location (or modulation of reflected light on the photosensor), for example, a photodiode that produces a signal of a higher magnitude when a higher intensity of reflected light is detected, and produces a signal of a lower magnitude when a lower intensity of reflected light is detected. However, the sensor 122 may alternatively be any suitable sensor to detect the signal of the transmitter 136. The sensor 122 may be a photosensor that detects frequencies in the visible light spectrum, the infrared spectrum, the ultraviolet spectrum, or any other suitable frequency in the electromagnetic spectrum. The sensor 122 may be a photosensor that detects a particular frequency in the electromagnetic spectrum or may also be a photosensor that detects the absence of a particular frequency in the electromagnetic spectrum. However, the sensor 122 may be of any other suitable type of photosensor. A plurality of sensors 122 may be located at the off-focal area location 120 to receive a signal from a misaligned heliostat 130a that may be located anywhere amongst the field of heliostats 130. The sensor 122 is preferably coupled to the solar power tower 110 at the off-focal area location 120, but may alternatively be arranged in any other suitable manner.

In a first variation, the transmitter 136 for the misaligned heliostat 130a preferably transmits a signal that is common to the signals of at least a subset of other heliostats 130. In this variation, the processor 140 detects the presence of a signal at the sensor 122, indicating that there is a heliostat 130 that is misaligned. To identify the misaligned heliostat 130a, the processor 140 preferably instructs each heliostat in the portion of heliostats 130 with the common signal to modify (and/or pause) transmission of the signal in a successive manner such that when the signal detected at the sensor 122 is modified, then the misaligned heliostat 130a that is transmitting the signal as detected by the sensor 122 may be identified. The transmitter 136 may be the reflective mirror 132 as described above or may include a reflection modification element 138 of any other examples described above. The processor 140 may also perform a binary search type algorithm to identify the misaligned heliostat 130a among the heliostats in the portion of heliostats 130 with the common signal. For example, the processor 140 may instruct half of the heliostats 130 in the portion of heliostats 130 with the common signal to modify signal transmission. If the signal as detected by the sensor 122 is not modified, then the processor 140 can determine that the misaligned heliostat 130a is not within that half of the heliostats 130 in the portion of heliostats 130 with the common signal. The processor 140 may then proceed to instruct half of the heliostats 130 in the remaining portion of heliostats 130 to modify signal transmission, and the process will continue until the misaligned heliostat 130a is identified. However, the processor 140 may identify the misaligned heliostat 130a from the heliostats 130 transmitting a common signal using any other suitable method.

In a second variation, the transmitter 136 for the misaligned heliostat 130a preferably transmits a signal that is unique to the misaligned heliostat 130a. In this variation, the processor 140 detects the presence of a signal at the sensor 122, indicating that there is a heliostat 130 that is misaligned. Then, the processor 140 preferably analyzes the signal detected by the sensor 122 to determine the unique signal and compare it to stored information of each of the unique signals for each of the heliostats 130 in the plurality of heliostats 130 to identify the misaligned heliostat 130a from the unique signal. By providing each heliostat 130 with a unique signal, the processor 140 may identify the misaligned heliostat 130 much faster than in the first variation where search algorithms may need to be conducted in order to identify the misaligned heliostat 130, allowing faster correction of the misaligned heliostat 130a, which may lead to higher overall efficiency of the solar power generation plant.

As an example of the second variation, the transmitter 136 is the reflective mirror 132 as described above and each heliostat 130 includes a light filter as a reflection modification element 138. In this example, the light filter of each heliostat 130 preferably reflects a unique type of filtered light. When the misaligned heliostat 130a reflects the unique type of filtered light of that particular heliostat 130, the processor interprets the unique type of filtered light and identifies the misaligned heliostat 130a from the plurality of heliostats 130. The light filter may be electrically actuated such that reflected light is filtered only when the processor 140 actuates the filter. Because filtering light decreases the total energy that is in the light, filtering light only when necessary may decrease the amount of power loss through the filter, increasing the efficiency of the solar power generation plant. Alternatively, the reflective mirror 132 may include a coating that filters light in a unique way and reflects the filtered light. The coating preferably filters light that is in a relatively low power portion of the electromagnetic spectrum to decrease the amount of power loss through the filter, for example, the ultraviolet portion of the spectrum. In this variation, each heliostat 130 may include a filter that filters out a specific frequency within the ultraviolet spectrum that is detectable by the sensor 122 and the processor 140. However, any other suitable filtered light may be transmitted to the sensor 122.

Figure 5:
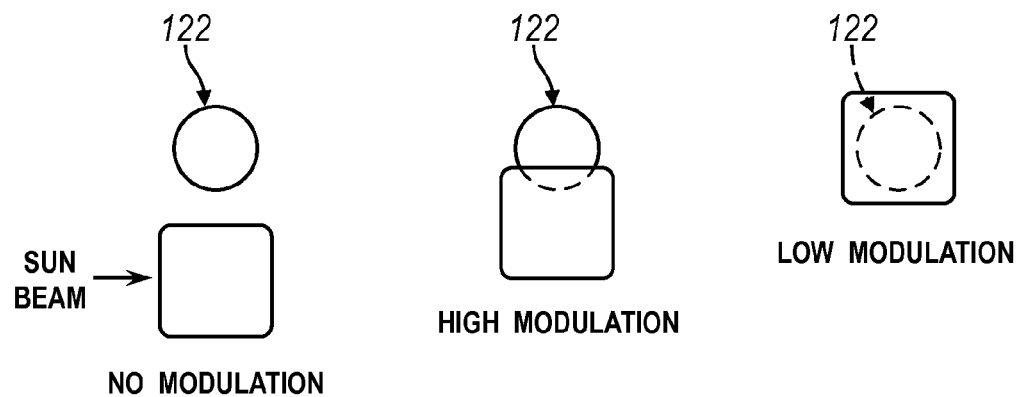
FIGS. 5a, 5b, and 5b are schematic representations of the modulation of a sensor located at the off-focal area location from an aligned heliostat and from a misaligned heliostat in a first and second position, respectively.
Figure 6:
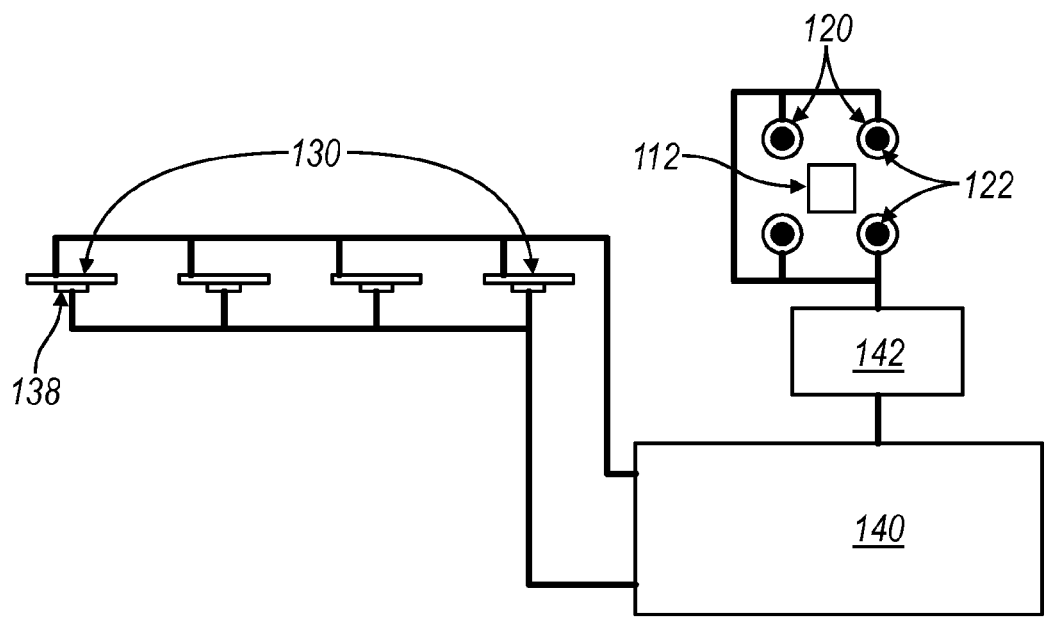
FIG. 6 is a schematic representation of the alignment system of a variation of the first preferred embodiment.

As another example of the second variation, the transmitter 136 is the reflective mirror 132 and each of the heliostats 130 of the plurality of heliostats 130 includes a vibration element that dithers the reflective mirror 132 of the heliostat 130 as the reflection modification element 138. In this example, the vibration element of each heliostat 130 in the plurality of heliostats 130 dithers the reflective mirror 132 of each heliostat 130 in a unique way such that the sunlight reflected towards the solar power tower 110 from each heliostat 130 is modified in a unique way. In a first variation of the vibration element, the vibration element dithers the reflective mirror 132 at a unique frequency or a unique combination of frequencies. In this first variation, the unique combination of frequencies may be a combination of two different frequencies, a combination of two different frequencies at a unique phase shift from each other, and/or any other suitable type of unique combination of frequencies. In a second variation of the vibration element, the vibration element dithers the reflective mirror 132 at a unique phase shift from other heliostats 130 in the plurality of heliostats 130. In a third variation of the vibration element, the vibration element dithers the reflective mirror 132 at a unique pattern, for example, dithering is turned on and off in a unique pattern. As shown in FIG. 5, the sensor 122 does not detect the reflected light from an aligned heliostat 130 (FIG. 5a), but the sensor 122 detects the light from a misaligned heliostat 130a (FIGS. 5b and 5c). As the reflective mirror 132 of a misaligned heliostat 130a is dithered, the amount of reflected sunlight that is detected by the sensor 122 (which is preferably a photosensor as described above) changes as a function of the dithering of the reflective mirror 132. For example, the amount of reflected sunlight detected by the sensor 122 may change from a small amount (shown in FIG. 5b) to a large amount (shown in FIG. 5c), and the rate of change and pattern of change is directly related to the dithering of the reflective mirror 132. The processor 140 preferably determines the frequency and/or phase of the dithering. The processor 140 preferably analyzes the change amount of reflected sunlight detected by the sensor 122 as a function of time and performs a Fourier transform analysis to determine the frequency, combination of frequencies, and/or phase shift of the signal. The processor 140 may alternatively use any other suitable frequency detection method to determine the unique signal of the misaligned heliostat 130a. The processor 140 then preferably compares the detected frequency and/or phase shift of the signal to a stored database of known unique frequencies and their corresponding heliostats 130. When a match is found within the database, then the processor 140 is able to identify the particular heliostat 130 that is misaligned and that is the source of the signal. In the variation of the vibration element that dithers the reflective mirror 132 in a unique pattern, the processor 140 preferably detects the pattern and compares the detected pattern to a database of known unique patterns and their corresponding heliostats 130 to identify the particular heliostat 130 that is misaligned and that is the source of the signal. As shown in FIG. 6, when the sensor 122 detects a signal, the processor 140 preferably actuates the vibrating elements of each heliostat 130 to dither each reflective mirror 132 to identify the misaligned heliostat 130.

In some cases, reflected sunlight from a misaligned heliostat 130a may hit the sensor 122 such that dithering of the reflective mirror 132 of the misaligned heliostat 130a may not result in a detectable change in amount of reflected light detected by the sensor 122. Thus, a second sensor 122 may be placed relative to the first sensor 122 at the off-focal area location 120 such that reflected light from a misaligned heliostat 130a hits the second sensor 122 where dithering of the reflective mirror 132 is detectable by the second sensor 122. However, any other suitable arrangement may be used to facilitate the identification of the misaligned heliostat 130a from the plurality of heliostats 130.

The vibration element in each of these variations is preferably a speaker coil that is coupled to the reflective mirror 132 and dithers the reflective mirror 132 at a frequency within the audio frequency range, for example, between 10 hertz and 100 kilohertz. Alternatively, the vibration element may be a piezoelectric actuator that dithers the reflective mirror 132 at the audio frequency range. By dithering the reflective mirror 132 at a relatively high frequency, a high pass filter 142 may be used to filter out lower frequency noise that may result from wind or any other suitable source that may complicate analysis of the signal. Additionally, because a natural resonance frequency of the reflective mirrors 132 is typically located within this range, dither of the reflective mirror 132 at the audio frequency range also provides the advantage of triggering vibration of the reflective mirror 132 at a natural resonance frequency of the reflective mirror 132, resulting in vibrations at increased amplitude, which may facilitate frequency detection by the sensor 122 and/or the processor 140 (and may also minimize the power needed for the dithering). The processor 140 may instruct the vibration element of each heliostat 130 in the plurality of heliostats 130 to dither the reflective mirror 130 at a unique assigned frequency, which may match the natural resonance frequency of the particular reflective mirror 132. Alternatively, the alignment system 100 may be calibrated such that the natural resonance frequencies of each reflective mirror 132 is determined and assigned to be the unique resonance frequency of the heliostat 130, allowing the system 100 to utilize the benefits of dithering the reflective mirror 132 at the natural resonance frequency. Because of manufacturing differences that exist between reflective mirrors 132, each reflective mirror may naturally resonate at a unique frequency. Alternatively, each reflective mirror 132 may be manufactured with designed differences to cause different natural resonant frequencies. Yet alternatively, unique weights may be coupled to each reflective mirror 132 after manufacturing to induce difference natural resonant frequencies. However, the vibration element may dither the reflective mirror 132 at any other suitable frequency range and the vibration element may be any other suitable element. For example, the vibration element may include a weight and the reflection modification element 138 may actuate the weight to strike the reflective mirror 132 in a unique pattern to induce vibrations at a unique pattern.

The system and method of identifying the misaligned heliostat 130a is preferably one of the variations as described above, but may alternatively be a combination of the variations as described above. For example, the accuracy and efficiency of the identification of the misaligned heliostat may be increased by both reflecting sunlight filtered at a unique frequency and dithering the heliostat at a unique frequency to identify the misaligned heliostat 130a. Additionally, combining the variations as described above may increase the available unique signals for the plurality of heliostats 130. In a first example, it may be difficult to identify a unique detectable frequency in the ultraviolet spectrum to filter out for each heliostat 130 in the plurality of heliostats 130 and it may be difficult to identify a unique detectable frequency to dither each heliostat 130 in the plurality of heliostats 130. Thus, the methods of light filtration and heliostat dithering may be combined to create a larger range of unique combinations that may be assigned to each heliostat 130. In a second example, it may be difficult to identify a unique detectable frequency for each heliostat 130 in the plurality of heliostats 130, thus, a first heliostat 130 may emit a signal of a first frequency, a second heliostat 130 may emit a signal of a second frequency, and a third heliostat 130 may emit a signal with a unique combination of the first and second frequencies, allowing two frequencies to be used to identify three different heliostats 130. In yet another variation, the sensors 122 may include geometry that facilitates identification of the misaligned heliostat 130a. For example, the sensor 122 may include a geometry that detects reflect light from only one direction (for example, the sensor 122 may include a shield that blocks reflected light from any other direction). Thus, if the sensor 122 establishes a communication link with a misaligned heliostat 130a, information about the relative location of the misaligned heliostat 130a may already be determined because of the geometry of the sensor 122. However, any other suitable method that utilizes the communication link between the misaligned heliostat 130a and the off-focal area 120 may be used to identify the misaligned heliostat 130a from the plurality of heliostats 130.

The alignment system 100 is described as identifying a misaligned heliostat 130a from a plurality of heliostats 130. In certain scenarios, more than one misaligned heliostat 130a may be present in the alignment system 100. The alignment system 100 preferably also identifies the more than one misaligned heliostats 130a and determines the correction to realign each of the more than one misaligned heliostats 130a. A person skilled in the art will recognize that the techniques described here can be expanded to identify more than one misaligned heliostat 130a from the plurality of heliostats 130, for example, the sensor 122 may detect a signal from more than one misaligned heliostat 130a.

2. System of the Second Preferred Embodiment

In the second preferred embodiment, the sensor 126 of the misaligned heliostat 130a preferably receives a signal from the off-focal area location 120 through the communication link 124. As mentioned above, the communication link 124 is preferably direction based, thus, a signal from the off-focal area location 120 that is received by a heliostat 130 will indicate misalignment to the heliostat 130. In a first variation, the off-focal area location 130 may include a transmitter that broadcasts a signal that is detected by the sensor 126 when the misaligned heliostat 130a reflects sunlight towards the off-focal area location 120. The processor preferably interprets the detection of the signal as an indication of misalignment. In a second variation, the off-focal area location 130 may include a retroreflective material that reflects light back to its source with minimal scattering of the light. When a misaligned heliostat 130a reflects sunlight at the off-focal area location 120, the retroreflective material will reflect the light back the misaligned heliostat 130a and the sensor 126 preferably detects the returned light. In this variation, the sensor 126 may be a photosensor that is coupled to the reflective mirror 132 of the heliostat and that detects the increase light intensity as the reflected light is combined with sunlight hitting the reflective mirror 132. The sensor 126 may alternatively be a thermal sensor that detects the increased temperature that results from the increased light that hits the reflective mirror 132. However, the sensor 126 may be any other suitable sensor type. The misaligned heliostat 130a may alternatively receive any other suitable type of signal from the off-focal area location 120.

3. Method of the Preferred Embodiments

Figure 7:
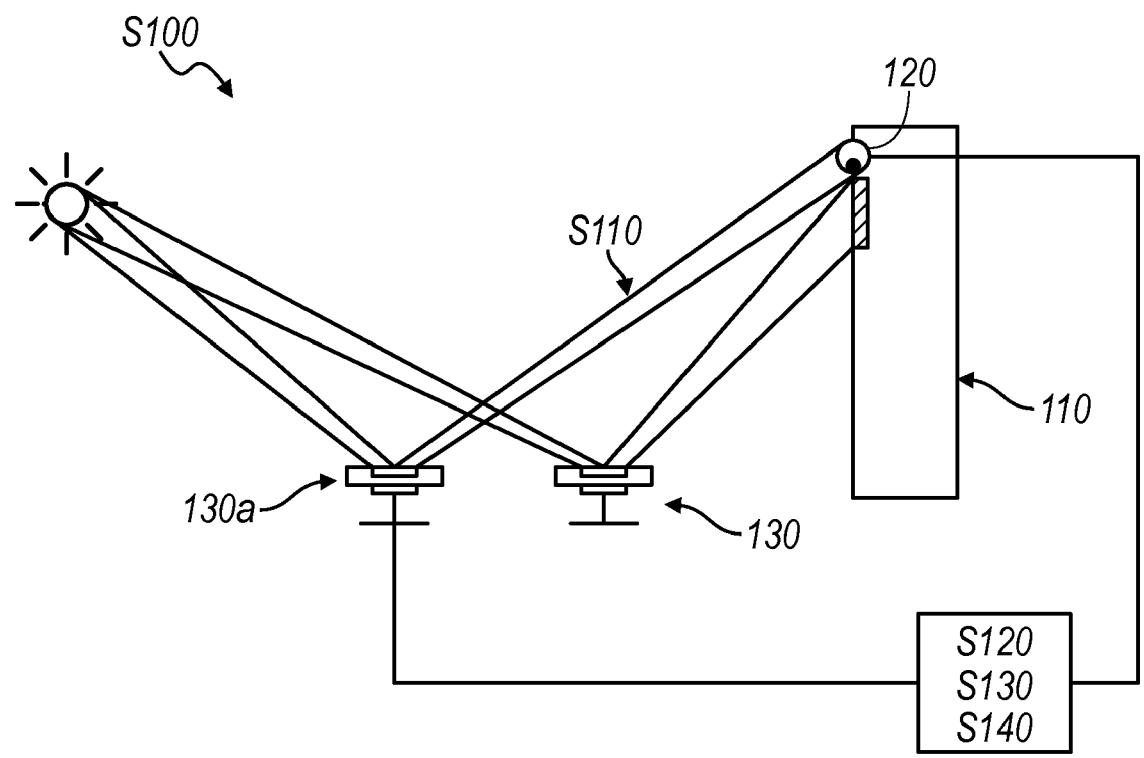
FIG. 7 is a schematic representation of the alignment method of the preferred embodiments.

As shown in FIG. 7, the alignment method S100 of the preferred embodiments for aligning heliostats that track the sun and reflect sunlight towards a focal area of a solar power tower includes the steps of establishing a communication link between the off-focal area location 120 and the misaligned heliostat 130a in Step S110, identifying the misaligned heliostat through the communication link in Step S120, detecting the correction for the identified misaligned heliostat in Step S130, and realigning the misaligned heliostat to reflect sunlight towards the focal area of the solar power tower 110 in Step S140.

The steps of identifying the misaligned heliostat through the communication link S120, detecting the correction for the identified misaligned heliostat S130, and realigning the misaligned heliostat to reflect sunlight towards the focal area of the solar power tower 110 S140, are preferably performed by a processor 140. Alternatively, one processor 140 may perform each of the steps. However, any other suitable arrangement of processing units may be used.

Similar to the system of the preferred embodiments, the alignment method S100 is preferably one of two preferred embodiments: a first preferred embodiment that further includes providing a sensor at the off-focal area location Step S141, and wherein the step of establishing a communication link between the off-focal area location and the misaligned heliostat S110 includes establishing a communication link between the sensor at the off-focal area location and the misaligned heliostat and a second preferred embodiment that further includes providing a sensor at each of the heliostats Step S143, where the step of establishing a communication link between the off-focal area location and the misaligned heliostat S110 includes sending a signal from the off-focal area location to the sensor of the misaligned heliostat Step S144.

In the first preferred embodiment, the alignment method S100, preferably further includes providing a transmitter at each of the heliostats Step S142, and the step of establishing a communication link between the sensor and the misaligned heliostat S110 includes transmitting a signal from the misaligned heliostat to the sensor Step S112. In a first variation of the first preferred embodiment, the step of transmitting a signal from the misaligned heliostat to the sensor S112 includes transmitting a signal common to at least a subset of the heliostats. In this variation, the step of identifying the misaligned heliostat through the communication link in Step S120 includes performing a search amongst the heliostats with the common signal to identify the misaligned heliostat from the subset of heliostats with the common signal. The step of performing a search may include pausing transmission of the signal from individual heliostats within the subset of heliostats with the common signal such that when the communication link between the sensor and the misaligned heliostat is broken, the misaligned heliostat may be identified. However, the step of identifying the misaligned heliostat through the communication link S120 may any other suitable method.

In a second variation of the first preferred embodiment, the step of transmitting a signal from the misaligned heliostat to the sensor S112 includes transmitting a signal unique to the misaligned heliostat. In this variation, the step of identifying the misaligned heliostat S120 includes determining the unique signal as detected by the sensor, comparing it to a database of known unique signals and the heliostat that is assigned to each unique signal, and identifying the misaligned heliostat from the detected unique signal. The step of transmitting a unique signal from the misaligned heliostat S112 may include transmitting a signal with a unique frequency and/or a unique phase shift from other heliostats. In this variation, the step of identifying the misaligned heliostat may include performing a Fourier transform analysis to identify the unique signal of the misaligned heliostat. Alternatively, the step of transmitting a unique signal from the misaligned heliostat S112 may include reflecting a light to the sensor in a unique pattern; for example, the reflective mirror of each heliostat may be covered at unique intervals to block light reflected to the solar power tower at a unique pattern. Yet alternatively, the step of transmitting a unique signal from the misaligned heliostat S112 may include reflecting a light filtered at a unique frequency to the sensor; for example, a light filter may be placed over the reflective mirror of each heliostat that reflects light to the solar power tower that has been filtered at a unique frequency. However, the step of transmitting a unique signal from the misaligned heliostat S112 may include a combination of the above types of unique signals or any other suitable type of unique signal.

In the second preferred embodiment, the alignment method S100 preferably further includes providing a sensor at each of the heliostats Step S143, where the step of establishing a communication link between the off-focal area location and the misaligned heliostat S110 includes sending a signal from the off-focal area location to the sensor of the misaligned heliostat S144. In this variation, the step of identifying the misaligned heliostat S120 includes detecting the signal from the off-focal area location at the sensor of the heliostat and determining that the heliostat receiving the signal is misaligned. The step of sending a signal from the off-focal area location to the sensor of the misaligned heliostat S144 may include providing a transmitter at the off-focal area location that sends a direction based signal to the sensor of the misaligned heliostat, but may alternatively include reflecting a signal from the misaligned heliostat to the off-focal area location to the sensor of the misaligned heliostat. For example, the off-focal area location may include a retroreflective material that reflects light back in the direction that the light came from. However, the step of sending a signal from the off-focal area location to the sensor of the misaligned heliostat S144 may be any other suitable method.

The alignment system 100 and the alignment method S100 of the preferred embodiments may both be used to calibrate individual heliostats 130 in the plurality of heliostats 130. For example, the each heliostat 130 may be moved until a communication link 124 is established between the heliostat 130 and the off-focal area 120. When the communication link 124 is established with a particular heliostat 130, the calibration of the particular heliostat 130 may be carried out in a variety of ways. In a first variation, the amount of movement (for example, the traversed angle) of the particular heliostat 130 from the original position to the position at which the communication link 124 is established may be compared to an expected amount of movement. If the expected amount of movement and the actual amount of movement are substantially identical, then the system may conclude that the particular heliostat 130 is aligned and substantially accurately positioned relative to the focal area 120. In a second variation, once the communication link 124 is established, the actual position of the particular heliostat 130 is known (e.g., the heliostat 130 is reflecting light toward the off-focal area location 120), and subsequent movements of the particular heliostat 130 are then based on the known heliostat 130 position established during calibration (for example, move the heliostat 130 10 milliradian from the known position to reflect light towards the focal area 112). However, any suitable method for calibration of the plurality of heliostats 130 using the alignment system 100 and the alignment method S100 may be used.

As a person skilled in the art will recognize from the previous detailed description and from the figures and claims, modifications and changes can be made to the preferred embodiments of the invention without departing from the scope of this invention defined in the following claims.

I claim:

1. A heliostat alignment system for a solar power tower with a focal area and an off-focal area location substantially close to the focal area of the solar power tower, comprising:
    a plurality of heliostats that each include a reflective mirror and include a sun tracking mechanism that moves and aligns the reflective mirror to reflect sunlight towards the focal area of the solar power tower;
    a communication device that—upon the misalignment of a heliostat—provides a communication link between the off-focal area location and the misaligned heliostat, the communication device includes a sensor located at each of the heliostats and arranged such that—upon the misalignment of a heliostat—the sensor of the misaligned heliostat receives a signal from the off-focal area location through the communication link; and
    a processor that interprets the communication link between the off-focal area location and the misaligned heliostat to identify the misaligned heliostat from the plurality of heliostats; wherein the processor determines and communicates a correction for the identified misaligned heliostat.

2. The heliostat alignment system of claim 1, further comprising a retro-reflectance device mounted to the solar power tower at the off-focal area location and arranged to reflect light from a misaligned heliostat back to the misaligned heliostat.

3. A heliostat alignment system for a solar power tower with a focal area and an off-focal area location substantially close to the focal area of the solar power tower, comprising:
    a plurality of heliostats that each include a reflective mirror and include a sun tracking mechanism that moves and aligns the reflective mirror to reflect sunlight towards the focal area of the solar power tower, each heliostat including a transmitter that transmits a signal;
    a communication device that—upon the misalignment of a heliostat—provides a communication link between the off-focal area location and the misaligned heliostat, wherein the communication device includes a sensor located at the off-focal area location that facilitates the communication link with the misaligned heliostat; and
    a processor that interprets the communication link between the off-focal area location and the misaligned heliostat to identify the misaligned heliostat from the plurality of heliostats; wherein the processor determines and communicates a correction for the identified misaligned heliostat;
    wherein—upon the misalignment of a heliostat—the misaligned heliostat transmits a signal to the sensor through the communication link.

4. The heliostat alignment system of Claim 3, wherein the sensor located at the off-focal area location is mounted to the solar power tower.

5. The heliostat alignment system of Claim 3, wherein each transmitter is the reflective mirror of the heliostat and the signal includes the reflected sunlight from the reflective mirror of the heliostat, wherein each heliostat includes a reflection modification element that modifies the reflection of sunlight towards the solar power tower, and wherein the sensor detects the modified reflection of sunlight.

6. The heliostat alignment system of Claim 5, wherein the sensor is a photodiode.

7. The heliostat alignment system of Claim 5, wherein the sensor is an infrared sensor.

8. The heliostat alignment system of Claim 5, wherein the reflection modification element of each heliostat includes a cover that blocks the reflection of sunlight towards the solar power tower.

9. The heliostat alignment system of Claim 5, wherein the reflection modification element of each heliostat is the sun tracking mechanism of the heliostat and wherein the sun tracking mechanism moves the reflective mirror to direct reflected sunlight substantially away from the solar power tower.

10. The heliostat alignment system of Claim 5, wherein the reflection modification element of each heliostat includes a light filter that modifies the light reflected towards the solar power tower from the reflective mirror of the heliostat.

11. The heliostat alignment system of claim 10, wherein the light filter absorbs a frequency of the electromagnetic spectrum that is detectable by the sensor.

12. The heliostat alignment system of claim 10, wherein the light filter is electrically actuated.

13. The heliostat alignment system of claim 10, wherein the light filter is a coating on the reflective mirror.

14. The heliostat alignment system of Claim 5, wherein the reflection modification element of each heliostat includes a vibration element that dithers the reflective mirror of the heliostat and modifies the light reflected towards the solar power tower from the reflective mirror of the heliostat.

15. The heliostat alignment system of claim 14, wherein the vibration element dithers the reflective mirror at a frequency in the audio frequency range.

16. The heliostat alignment system of claim 14, wherein the vibration element is a speaker coil.

17. The heliostat alignment system of claim 14, wherein the vibration element is a piezoelectric actuator.

18. The heliostat alignment system of claim 14, wherein the vibration element dithers the reflective mirror and modifies the light reflected towards the solar power tower according to a signal characteristic selected from the group consisting of:
    frequency and phase.

19. The heliostat alignment system of claim 14, wherein the signal of the misaligned heliostat is common to the signals of at least a subset of the heliostats.

20. The heliostat alignment system of claim 19, wherein the processor instructs a first heliostat of the subset of the heliostats with a common signal to pause transmission of the signal and a second heliostat of the subset of the heliostats with a common signal to pause transmission of the signal, and wherein the processor interprets a pause in the communication between the sensor and the misaligned heliostat to identify the misaligned heliostat.

21. The heliostat alignment system of claim 20, wherein the processor performs a binary search function to identify the misaligned heliostat.

22. The heliostat alignment system of claim 14, wherein the signal of the misaligned heliostat is unique to the misaligned heliostat, and wherein the processor interprets the unique signal detected at the sensor and identifies the misaligned heliostat.

23. The heliostat alignment system of claim 22, wherein each of the transmitters transmits a signal that is unique in a signal characteristic selected from the group consisting of: frequency and phase.

24. The heliostat alignment system of claim 23, wherein the processor performs a Fourier transform analysis to determine the unique frequency or phase of the signal detected by the sensor.

25. The heliostat alignment system of claim 22, wherein each of the transmitters transmits a signal that is unique in pattern.

26. The heliostat alignment system of claim 22, wherein each of the transmitters transmits a light filtered at a unique frequency.

27. A method for aligning heliostats that track the sun and reflect sunlight towards a focal area of a solar power tower, comprising the steps of:
provides a sensor at each of the heliostats;
establishing a communication link between an off-focal area location substantially close to the focal area of the solar power tower and a misaligned heliostat, including sending a signal from the off-focal area location to the sensor of the misaligned heliostat;
identifying the misaligned heliostat through the communication link;
detecting a correction for the identified misaligned heliostat; and
realigning the misaligned heliostat to reflect sunlight towards the focal area of the solar power tower.

28. The method of claim 27, wherein the step of sending a signal from the off-focal area location to the sensor of the misaligned heliostat includes reflecting a signal from the misaligned heliostat to the off-focal area location to the sensor of the misaligned heliostat.

29. A method for aligning heliostats that track the sun and reflect sunlight towards a focal area of a solar power tower, comprising the steps of:
providing a sensor at the off-focal area location substantially close to the focal area of the solar power tower;
providing a transmitter at each of the heliostats;
establishing a communication link between the off-focal area location and a misaligned heliostat, including establishing a communication link between the sensor at the off-focal area location and the misaligned heliostat and transmitting a signal from the misaligned heliostat to the sensor;
identifying the misaligned heliostat through the communication link;
detecting a correction for the identified misaligned heliostat; and
realigning the misaligned heliostat to reflect sunlight towards the focal area of the solar power tower.

30. The method of Claim 29, wherein the step of transmitting a signal from the misaligned heliostat to the sensor includes transmitting a signal common to at least a subset of the heliostats.

31. The method of Claim 29, wherein the step of transmitting a signal from the misaligned heliostat to the sensor includes transmitting a signal unique to the misaligned heliostat.

32. The method of Claim 31, wherein the step of identifying the misaligned heliostat includes performing a Fourier transform analysis to identify the unique signal of the misaligned heliostat.

33. The method of Claim 31, wherein the step of transmitting a signal unique to the misaligned heliostat includes transmitting a signal unique in a signal characteristic selected from the group consisting of: frequency and phase.

34. The method of Claim 31, wherein the step of transmitting a signal unique to the misaligned heliostat includes reflecting light to the sensor in a unique pattern.

35. The method of Claim 31, wherein the step of transmitting a signal unique to the misaligned heliostat includes reflecting a light filtered at a unique frequency to the sensor.

* * * * *